United States Patent
Park et al.

(10) Patent No.: US 9,844,045 B2
(45) Date of Patent: Dec. 12, 2017

(54) METHOD FOR TRANSCEIVING DOWNLINK SIGNAL IN WIRELESS COMMUNICATION SYSTEM AND APPARATUS THEREFOR

(71) Applicant: LG ELECTRONICS INC., Seoul (KR)

(72) Inventors: Jonghyun Park, Anyang-si (KR); Dongyoun Seo, Anyang-si (KR); Yunjung Yi, Anyang-si (KR); Hanbyul Seo, Anyang-si (KR); Kijun Kim, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/426,933

(22) PCT Filed: Oct. 10, 2013

(86) PCT No.: PCT/KR2013/009046
§ 371 (c)(1),
(2) Date: Mar. 9, 2015

(87) PCT Pub. No.: WO2014/065525
PCT Pub. Date: May 1, 2014

(65) Prior Publication Data
US 2015/0282126 A1 Oct. 1, 2015

Related U.S. Application Data

(60) Provisional application No. 61/730,945, filed on Nov. 28, 2012, provisional application No. 61/729,301, (Continued)

(51) Int. Cl.
*H04L 5/00* (2006.01)
*H04W 72/04* (2009.01)

(52) U.S. Cl.
CPC ......... *H04W 72/042* (2013.01); *H04L 5/0048* (2013.01); *H04L 5/0091* (2013.01);
(Continued)

(58) Field of Classification Search
None
See application file for complete search history.

(56) References Cited

U.S. PATENT DOCUMENTS

2010/0074209 A1* 3/2010 Montojo ........... H04W 72/1231
370/329
2010/0077100 A1* 3/2010 Hsu .................. H04W 72/1221
709/234

(Continued)

FOREIGN PATENT DOCUMENTS

CN 102647751 A 8/2012
EP 2903174 A1 8/2015

(Continued)

OTHER PUBLICATIONS

Samsung, "Remaining issues on quasi co-location of antenna ports", R1-123493, 3GPP TSC-RAN WG1#70 meeting, Qingdao, P.R. China, Aug. 13-17, 2012 See pp. 1-7.

(Continued)

*Primary Examiner* — Ayaz Sheikh
*Assistant Examiner* — Tarell Hampton
(74) *Attorney, Agent, or Firm* — Dentons US LLP

(57) ABSTRACT

Disclosed is a method for a terminal for receiving a downlink signal from a plurality of cells according to the semi-persistent scheduling (SPS) method in a wireless communication system. Specifically, the method comprises the steps of: receiving, in a first subframe, a first or second type scheduling information indicating an activation, according to the SPS method, from a serving cell from among the plurality of cells; and, in the first subframe and a second (Continued)

subframe configured via a higher layer after the first subframe, receiving the downlink signal from one cell from among the plurality of cells in accordance with resource allocation information comprised in the first or the second type scheduling information, wherein the first type scheduling information comprises quasi co-location (QCL) information for the serving cell and the one cell, and the QCL information applied in the first and second subframes is updated in accordance with the type of the scheduling information.

10 Claims, 12 Drawing Sheets

Related U.S. Application Data filed on Nov. 21, 2012, provisional application No. 61/722,127, filed on Nov. 2, 2012, provisional application No. 61/721,455, filed on Nov. 1, 2012, provisional application No. 61/719,938, filed on Oct. 29, 2012, provisional application No. 61/718,700, filed on Oct. 25, 2012.

(52) U.S. Cl.
CPC ......... *H04W 72/0446* (2013.01); *H04L 5/001* (2013.01); *H04L 5/0035* (2013.01); *H04L 5/0044* (2013.01)

(56) References Cited

U.S. PATENT DOCUMENTS

| | | | |
|---|---|---|---|
| 2010/0157927 A1* | 6/2010 | Mochizuki | H04L 1/1685 370/329 |
| 2011/0141987 A1 | 6/2011 | Nam et al. | |
| 2013/0244676 A1* | 9/2013 | Koivisto | H04L 25/0224 455/452.1 |
| 2014/0092827 A1* | 4/2014 | Jongren | H04L 5/0053 370/329 |
| 2014/0092829 A1* | 4/2014 | Han | H04L 5/0053 370/329 |
| 2014/0119266 A1* | 5/2014 | Ng | H04L 1/0061 370/312 |

FOREIGN PATENT DOCUMENTS

| | | |
|---|---|---|
| JP | 2015-532822 A | 11/2015 |
| JP | 2016-500213 A | 1/2016 |
| KR | 1020120027107 A | 3/2012 |
| WO | 2011115389 A2 | 9/2011 |
| WO | 2012096476 A2 | 7/2012 |

OTHER PUBLICATIONS

Ericsson, "LS response on antenna ports co-location", R1-121919, 3GPP TSG-RAN1 Meeting #68bis, Jeju, Korea, Mar. 26-30, 2012 See pp. 1-2.
Samsung: "Downlink Control Signalling for CoMP", 3GPP TSG RAN WG1 #70bis, R1-124364, Oct. 8-12, 2012.
LG Electronics: SIgnaling for quasi co-location assumptions and PDSCH rate matching, 3GPP TSG RAN WG1 Meeting #70bis, R1-124316.
Search Report of European Patent Office in Appl'n No. 13849622.9, dated Jun. 13, 2016.
International Search Report from PCT/KR2013/009046, dated Dec. 31, 2013.
Written Opinion of the ISA from PCT/KR2013/009046, dated Dec. 31, 2013.
"Configuration of semi-persistent scheduling in TM10" 3GPP TSG-RAN WG1 #71, New Orleans, USA, Nov. 12-16, 2012, R1-124721.
"SPS-based PDSCH transmission for TM10" 3GPP TSG RAN WG1 #71, New Orleans, USA, Nov. 12-16, 2012, R1-124979.
"WF on SPS PDSCH in TM10" 3GPP TSG RAN WG1 #71, New Orleans, USA, Nov. 12-16, 2012, R1-125368.

* cited by examiner

FIG. 2
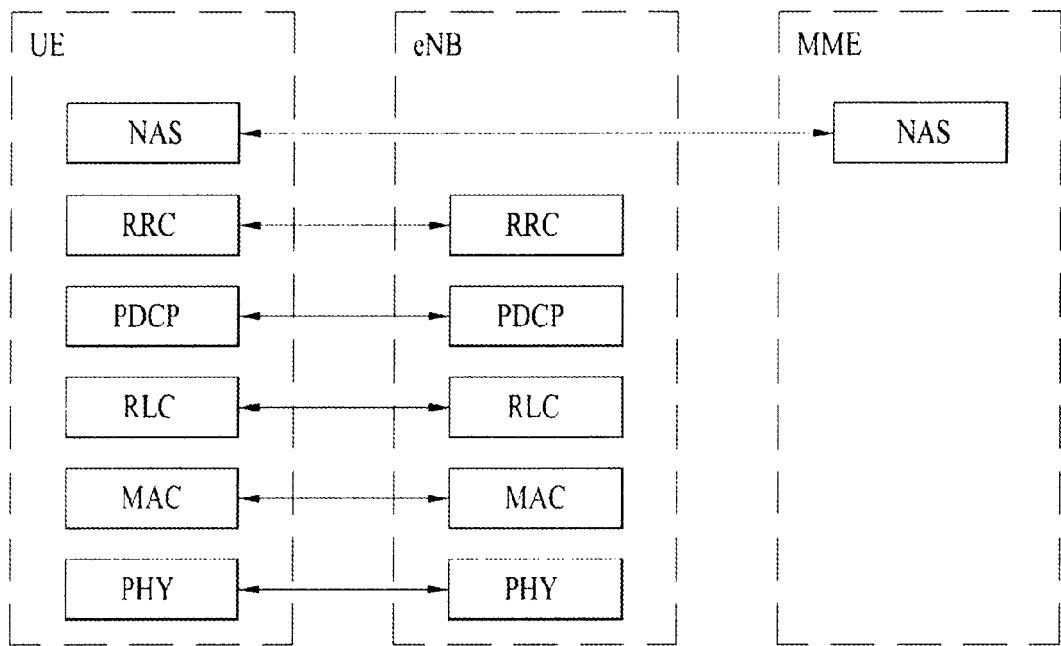
(A) CONTROL-PLANE PROTOCOL STACK
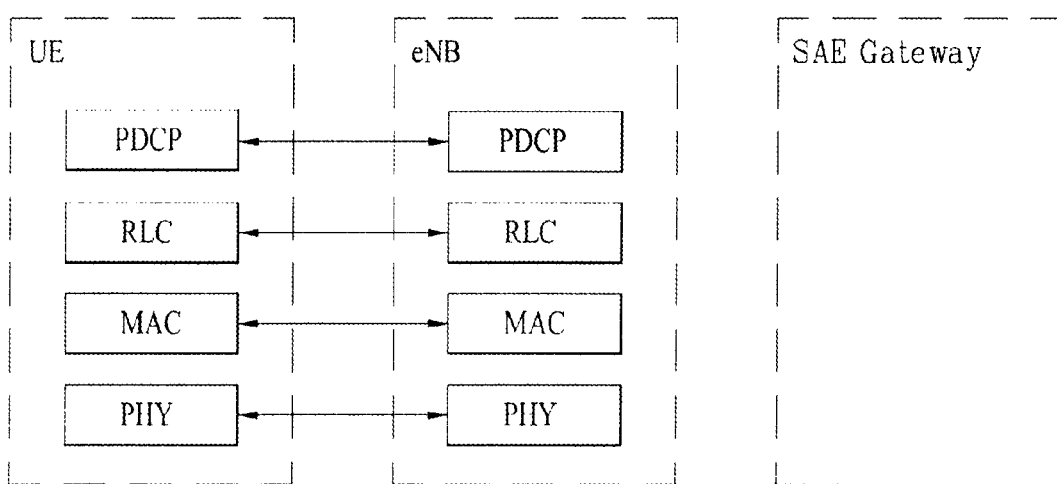
(B) USER-PLANE PROTOCOL STACK FIG. 10
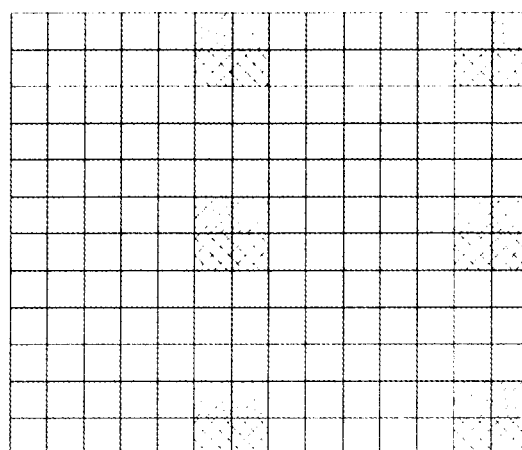
 : DMRS GROUP 1
 : DMRS GROUP 2

FIG. 11
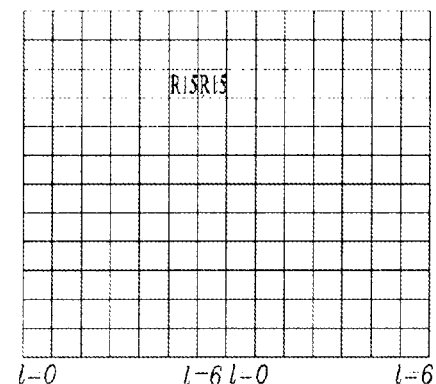
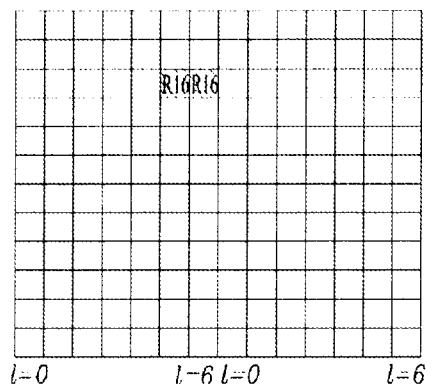
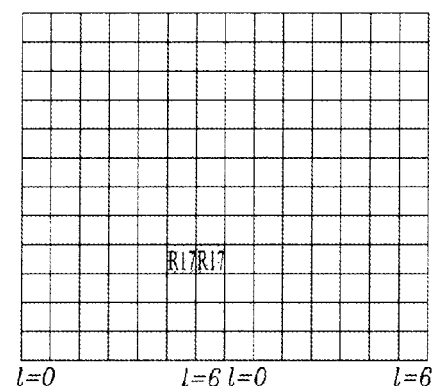
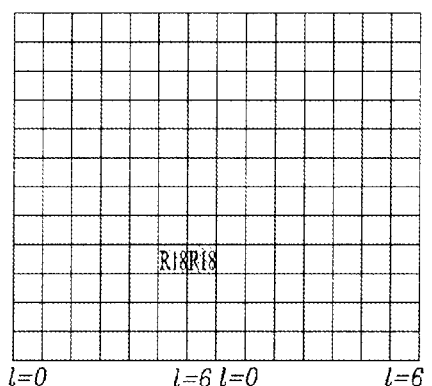
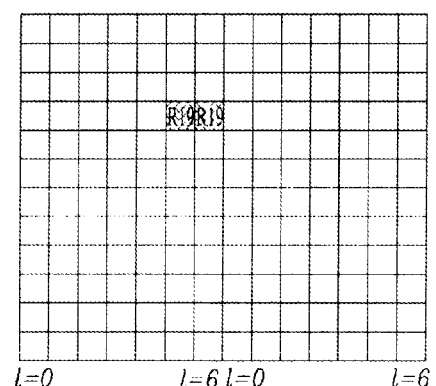
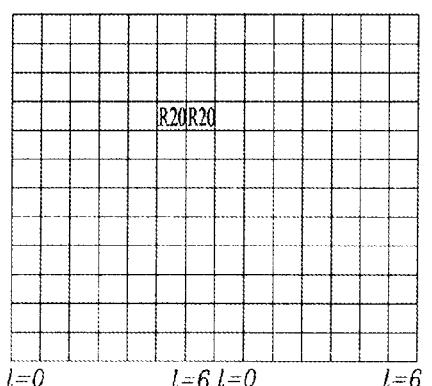
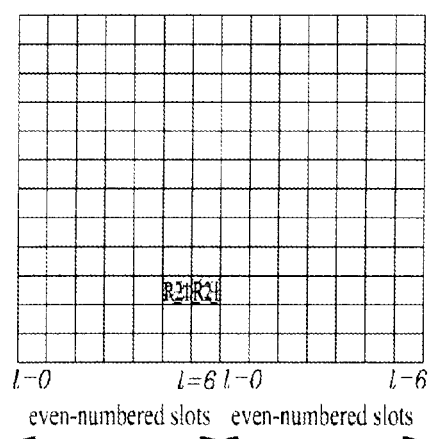
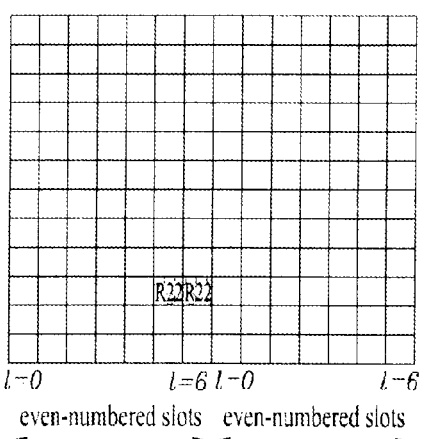

METHOD FOR TRANSCEIVING DOWNLINK SIGNAL IN WIRELESS COMMUNICATION SYSTEM AND APPARATUS THEREFOR

This application is a 35 U.S.C. §371 National Stage Entry of International Application No. PCT/KR2013/009046 filed Oct. 10, 2013, which claims benefit of and priority to U.S. Provisional Application Nos. 61/718,700 filed Oct. 25, 2012, 61/719,938 filed Oct. 29, 2012, 61/721,455 filed Nov. 1, 2012, 61/722,127 filed Nov. 2, 2012, 61/729,301 filed Nov. 21, 2012, and 61/730,945 filed Nov. 28, 2012, all of which are incorporated by reference for all purposes as if fully set forth herein.

TECHNICAL FIELD

The present invention relates to a wireless communication system and, more particularly, to a method and apparatus for transmitting and receiving a downlink signal in a wireless communication system.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method and apparatus for transmitting and receiving a downlink signal in a wireless communication system.

Technical Solution

The object of the present invention can be achieved by providing a method of, at a user equipment (UE), receiving a downlink signal from a plurality of cells using a semi persistent scheduling (SPS) scheme in a wireless communication system including receiving first type scheduling information or second type scheduling information indicating activation of the SPS scheme on a first subframe from a serving cell among the plurality of cells, and receiving the downlink signal on the first subframe and a second subframe configured via a higher layer after the first subframe from one cell among the plurality of cells, according to resource assignment information included in the first type scheduling information or the second type scheduling information, wherein the first type scheduling information includes quasi co-location (QCL) information with the serving cell and the cell, and wherein QCL information applied to the first subframe and the second subframe is changed according to a type of scheduling information.

In another aspect of the present invention, provided herein is a method of, at a network, transmitting a downlink signal to a user equipment (UE) via a plurality of cells using a semi persistent scheduling (SPS) scheme in a wireless communication system including transmitting first type scheduling information or second type scheduling information indicating activation of the SPS scheme on a first subframe via a serving cell among the plurality of cells, and transmitting the downlink signal on the first subframe and a second subframe configured via a higher layer after the first subframe via one cell among the plurality of cells, according to resource assignment information included in the first type scheduling information or the second type scheduling information, wherein the first type scheduling information includes quasi co-location (QCL) information with the serving cell and the cell, and wherein QCL information applied to the first subframe and the second subframe is changed according to a type of scheduling information.

If the first type scheduling information is transmitted and received, the downlink signal transmitted and received on the first subframe and the second subframe may be processed based on QCL information included in the first type scheduling information.

If the second type scheduling information is transmitted and received, the downlink signal transmitted and received on the first subframe and the second subframe is processed based on default QCL information defined by the higher layer.

The second type scheduling information may not include QCL information with the serving cell and the cell.

The QCL information may indicate a predetermined reference signal, a large scale property of which is equal to that of a reference signal for demodulating the downlink signal. The predetermined reference signal may be a channel status information-reference signal (CSI-RS). The large scale property may include at least one of Doppler spread, Doppler shift, average delay and delay spread.

Advantageous Effects

According to embodiments of the present invention, it is possible to more efficiently transmit and receive a downlink signal in a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

FIGS. 2(A) and (B) are diagrams showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

FIG. 10 is a diagram showing a downlink DM-RS assignment example defined in the current 3GPP standard.

FIG. 11 is a diagram showing CSI-RS configuration #0 in case of a normal cyclic prefix (CP) among downlink CSI-RS configurations defined in the current 3GPP standard.

BEST MODE

Figure 1:
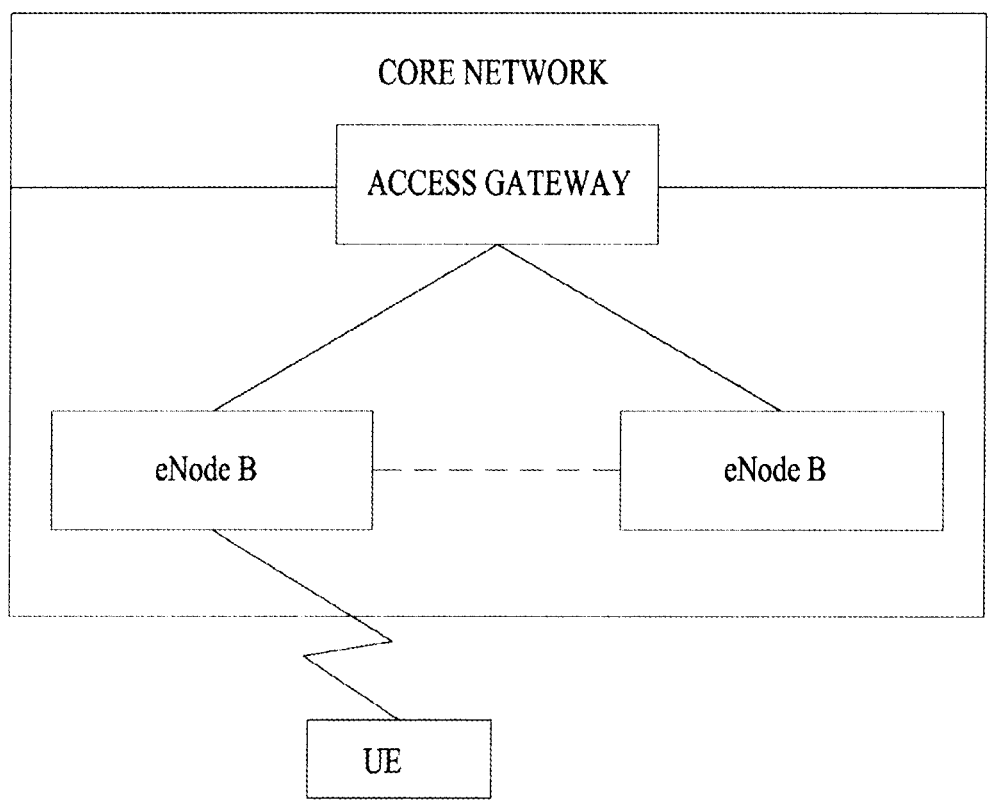
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

In addition, in the present specification, the term "base station" may include a remote radio head (RRH), an eNB, a transmission point (TP), a reception point (RP), a relay, etc.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
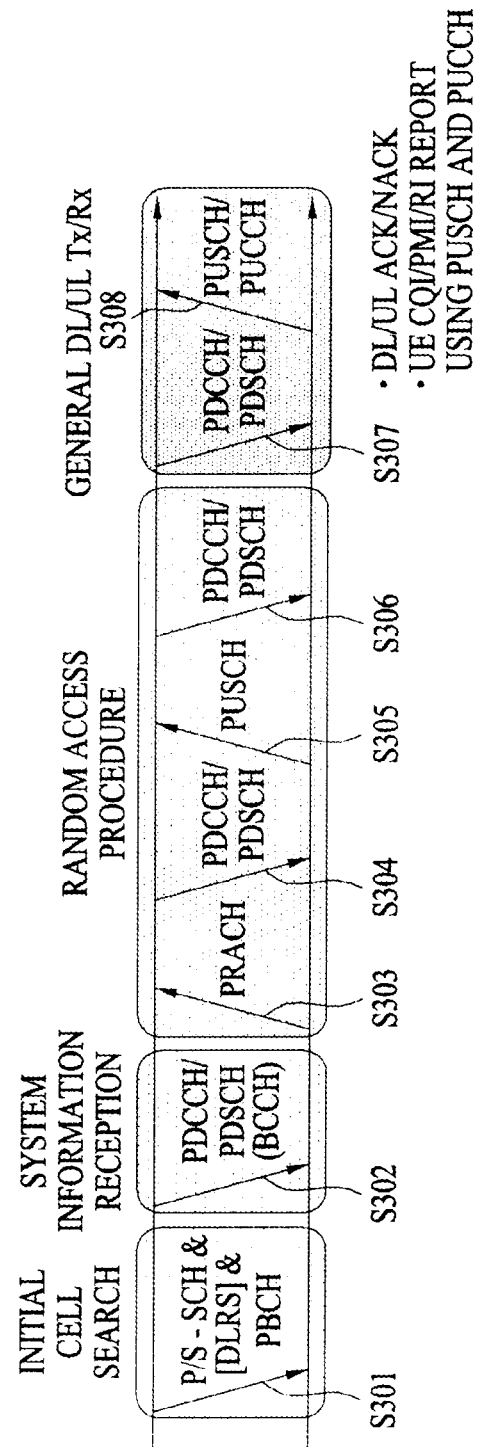
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
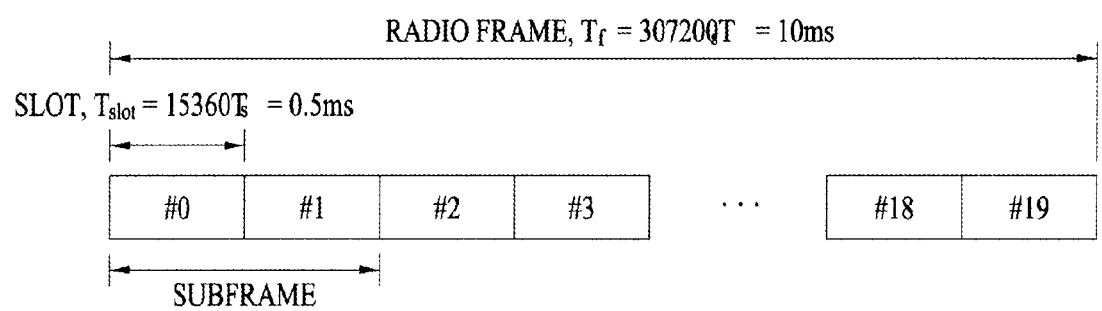
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$).

$T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
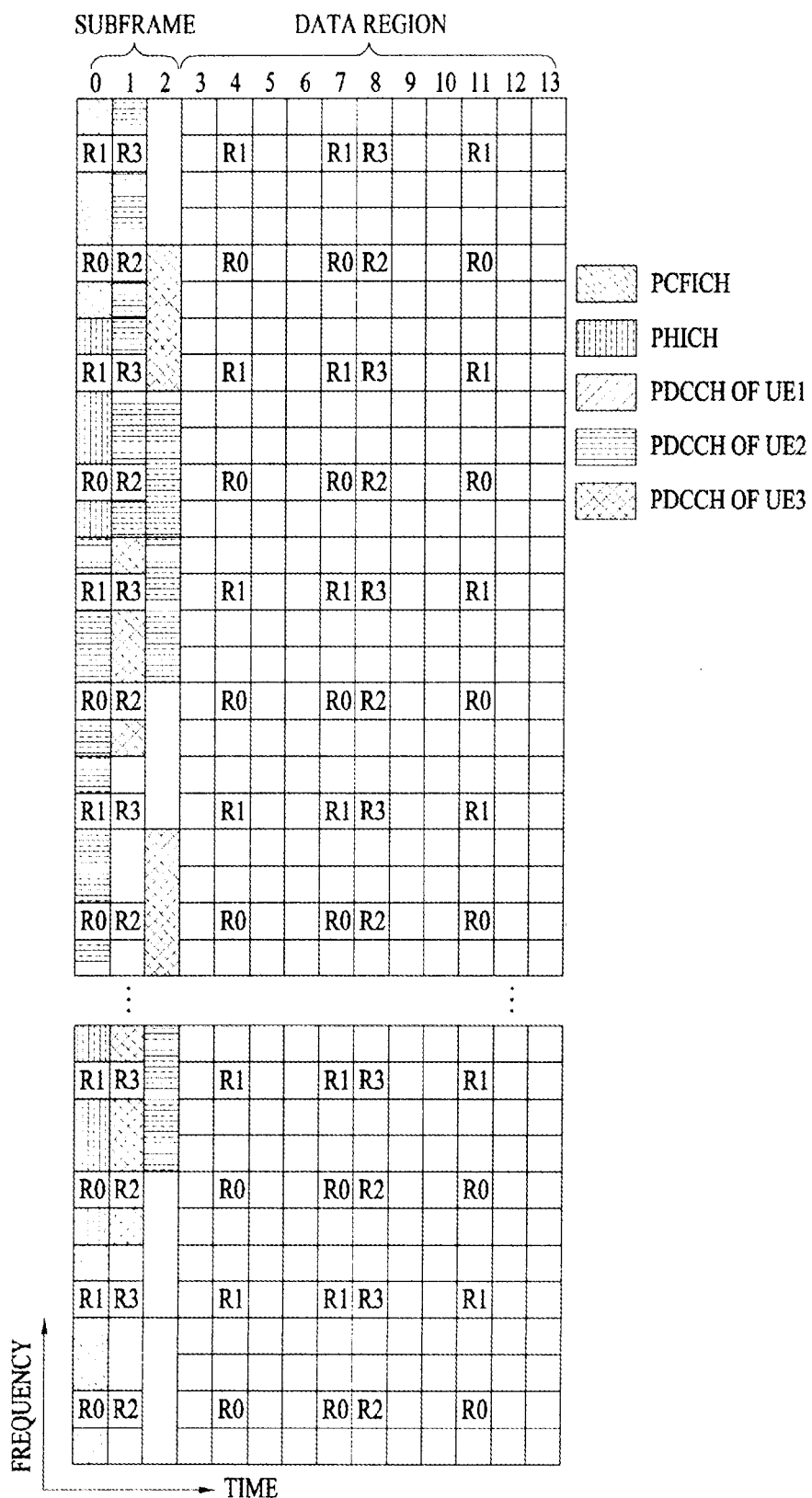
FIG. 5 is a diagram showing the structure of a downlink radio frame used in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
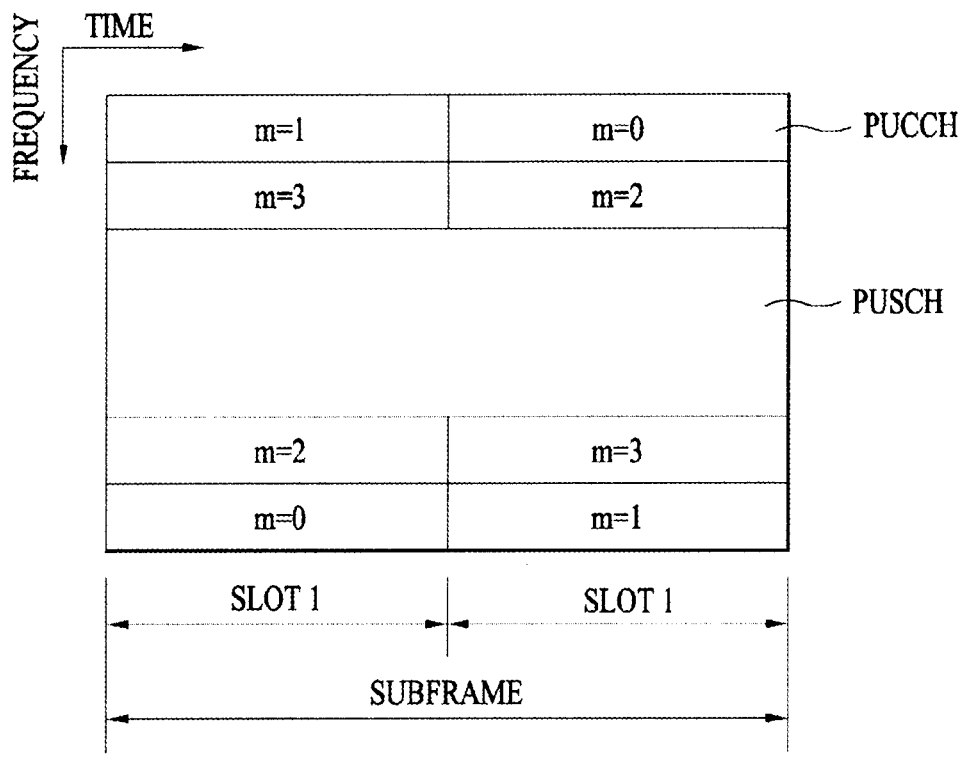
FIG. 6 is a diagram showing the structure of an uplink subframe used in an LTE system.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or sub-carriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 7:
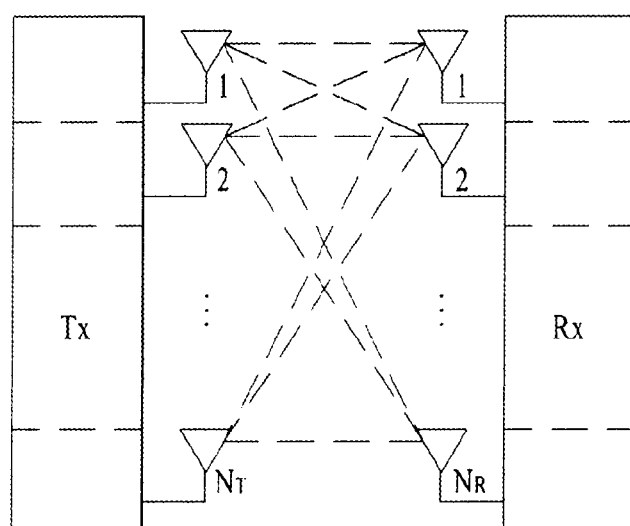
FIG. 7 is a diagram showing the configuration of a general multiple input multiple output (MIMO) system.

The configuration of the general multi-antenna (MIMO) communication system is shown in FIG. 7. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1 below. Here, $R_i$ is the smaller of the two values $N_T$ and $N_R$.

$$R_i = \min(N_T, N_R) \qquad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 7, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2 below.

$$s = [s_1, s_2, \ldots, s_{N_T}]^T \qquad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{s}$ may be expressed using a diagonal matrix P of the transmit powers as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Considers that the $N_T$ actually transmitted signals $x_1, x_2, \ldots, x_{N_T}$ are configured by applying a weight matrix W to the information vector $\hat{s}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5 below. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} =$$

[Equation 5]

$$\begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank}(H) \leq \min(N_T, N_r)$$ [Equation 6]

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7 below.

$$\text{\# of streams} \leq \text{rank}(H) \leq \min(N_T, N_R)$$ [Equation 7]

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

Meanwhile, in an LTE-A system which is a next-generation mobile communication system, in order to improve a data transfer rate, a Coordinated Multi Point (CoMP) transmission scheme which was not supported in the conventional standard will be supported. Here, the CoMP transmission scheme refers to a transmission scheme for performing communication with a UE by coordination between two or more eNBs or cells in order to improve communication performance between a UE located in a shadow region and an eNB (cell or sector).

The CoMP transmission scheme may be divided into a coordinated MIMO-based Joint Processing (JP) scheme through data sharing and a CoMP-Coordinated Scheduling/Coordinated Beamforming (CoMP-CS/CB) scheme.

In case of downlink, in the CoMP-JP scheme, a UE may instantaneously and simultaneously receive data from eNBs, each of which implements a CoMP transmission scheme, and combine the signals received from the eNBs so as to improve reception performance (Joint Transmission (JT)). In addition, a method of transmitting data from one of eNBs, each of which performs a CoMP transmission scheme, to a UE at a specific time may be considered (Dynamic Point Selection (DPS)).

In the CoMP-CS/CB scheme, a UE may instantaneously receive data from one eNB, that is, a serving eNB, through beamforming.

In case of uplink, in the CoMP-JP scheme, eNBs may simultaneously receive a PUSCH signal from a UE (Joint Reception (JR)). In the CoMP-CS/CB scheme, only one eNB receives a PUSCH. At this time, a determination as to whether a CoMP/CS-CB scheme is used is made by coordinated cells (or eNBs).

Hereinafter, a reference signal will be described in greater detail.

In general, for channel measurement, a reference signal known to a transmitter and a receiver is transmitted from the transmitter to the receiver along with data. Such a reference signal indicates a modulation scheme as well as channel measurement to enable a demodulation process. The reference signal is divided into a dedicated reference signal (DRS) for a base station and a specific UE, that is, a UE-specific reference signal, and a common reference signal or cell-specific reference signal (CRS) for all UEs in a cell. The CRS includes a reference signal used when a UE measures and reports CQI/PMI/RI to a base station and is also referred to as a channel state information (CSI)-RS.

Figure 8:
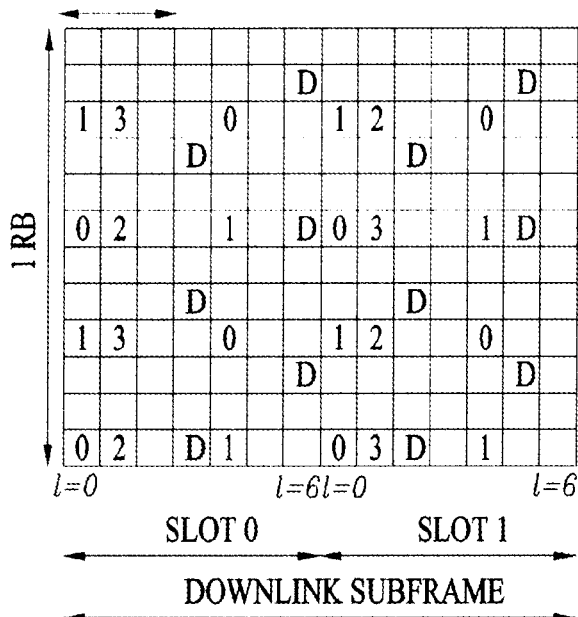
FIGS. 8 and 9 are diagrams the structure of a downlink reference signal in an LTE system supporting downlink transmission using four antennas.
Figure 9:
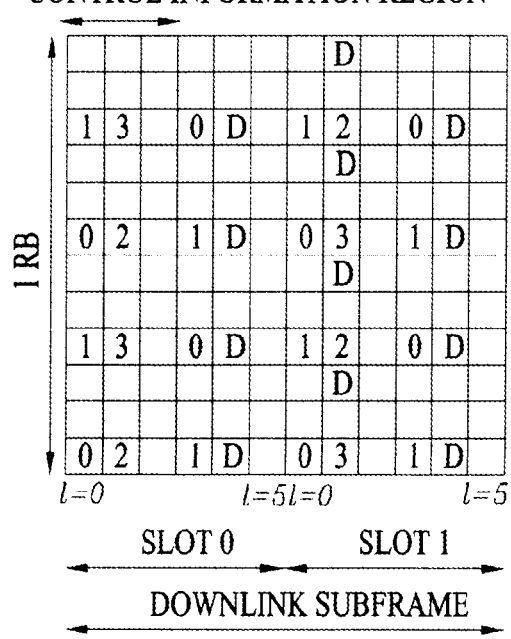

FIGS. 8 and 9 are diagrams showing the structure of a downlink reference signal in an LTE system supporting downlink transmission using four antennas. In particular, FIG. 8 shows a normal cyclic prefix (CP) and FIG. 9 shows an extended CP.

Referring to FIGS. 8 and 9, numerals 0 to 3 in grids mean CRSs transmitted for channel measurement and data demodulation and the CRSs may be transmitted to the UE not only in a data information region but also in a control information region.

In addition, "D" in a grid means a downlink demodulation-RS (DM-RS) which is a UE-specific RS and the DM-RS supports single antenna port transmission via a data region, that is, a physical downlink shared channel (PDSCH). The UE receives information indicating presence/absence of a DM-RS, which is a UE-specific RS, via a higher layer. FIGS. 8 and 9 show DM-RSs corresponding to antenna port 5. In the 3GPP standard 36.211, DM-RSs for antenna ports 7 to 14, that is, a total of eight antenna ports, are also defined.

FIG. 10 is a diagram showing a downlink DM-RS allocation example defined in the current 3GPP standard.

Referring to FIG. 10, DM-RSs corresponding to antenna ports {7, 8, 11, 13} are mapped to DM-RS group 1 using a sequence per antenna port and DM-RSs corresponding to antenna ports {9, 10, 12, 14} are mapped to DM-RS group 2 using a sequence per antenna port.

The above-described CSI-RS is proposed for the purpose of channel measurement of a PDSCH, separately from a CRS. Unlike the CRS, the CSI-RS may be defined as a maximum of 32 different resource configurations in order to reduce inter-cell interference (ICI) in a multi-cell environment.

CSI-RS (resource) configurations differ according to the number of antenna ports and CSI-RSs defined as maximally different CSI-RS configurations are configured to be transmitted between neighbor cells. Unlike the CRS, the CSI-RS supports a maximum of eight antenna ports. In the 3GPP standard, antenna ports 15 to 22, that is, a total of eight antenna ports, are allocated as antenna ports for CSI-RS. Tables 1 and 2 below show CSI-RS configurations defined in the 3GPP standard. In particular, Table 1 shows a normal CP and Table 2 shows an extended CP.

TABLE 1

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
|  | 1 | (11, 2) | 1 | (11, 2) | 1 | (11, 2) | 1 |
|  | 2 | (9, 2) | 1 | (9, 2) | 1 | (9, 2) | 1 |
|  | 3 | (7, 2) | 1 | (7, 2) | 1 | (7, 2) | 1 |
|  | 4 | (9, 5) | 1 | (9, 5) | 1 | (9, 5) | 1 |
|  | 5 | (8, 5) | 0 | (8, 5) | 0 |  |  |
|  | 6 | (10, 2) | 1 | (10, 2) | 1 |  |  |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

TABLE 2

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| Frame structure type 2 only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 |  |  |
|  | 20 | (4, 1) | 1 | (4, 1) | 1 |  |  |
|  | 21 | (3, 1) | 1 | (3, 1) | 1 |  |  |
|  | 22 | (8, 1) | 1 |  |  |  |  |

TABLE 2-continued

| CSI reference | Number of CSI reference signals configured | | | | | |
|---|---|---|---|---|---|---|
| signal | 1 or 2 | | 4 | | 8 | |
| configuration | (k', l') | $n_s$ mod 2 | (k', l') | $n_s$ mod 2 | (k', l') | $n_s$ mod 2 |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

In Tables 1 and 2, (k', l') denote an RE index, k' denotes a subcarrier index and l' denotes an OFDM symbol index. FIG. 11 shows CSI-RS configuration #0 in a normal CP among CSI-RS configurations defined in the current 3GPP standard.

In addition, a CSI-RS subframe configuration may be defined and includes periodicity $T_{CSI-RS}$ expressed in subframe units and a subframe offset $\Delta_{CSI-RS}$. Table 3 below shows a CSI-RS subframe configuration defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Currently, information on a zero-power (ZP) CSI-RS is transmitted in a state of being included in a CSI-RS-Config-r10 message via an RRC layer signal as shown in Table 4 below. In particular, a ZP CSI-RS resource configuration includes zeroTxPowerSubframeConfig-r10 and a 16-bit bitmap zeroTxPowerResourceConfigList-r10. zeroTxPowerSubframeConfig-r10 indicates transmission periodicity of a ZP CSI-RS and a subframe offset via a value ICSI-RS corresponding to Table 3. zeroTxPowerResourceConfigList-r10 indicates a ZP CSI-RS configuration and each element of the bitmap indicates configurations included in a column in which the number of CSI-RS antenna ports is 4 in Table 1 or 2. That is, according to the current 3GPP standard, the ZP CSI-RS is defined only when the number of CSI-RS antenna ports is 4.

TABLE 4

```
-- ASN1START
CSI-RS-Config-r10 ::=    SEQUENCE {
    csi-RS-r10              CHOICE {
        ...
    }
    zeroTxPowerCSI-RS-r10   CHOICE {
        release                 NULL,
        setup                   SEQUENCE {
            zeroTxPowerResourceConfigList-r10   BIT STRING (SIZE (16)),
            zeroTxPowerSubframeConfig-r10       INTEGER (0..154)
        }
    }
}
-- ASN1STOP
```

Operation for calculating CQI via interference measurement will now be described. For reference, according to the current 3GPP standard, a CQI index, a modulation order corresponding thereto, a coding rate, etc. are shown in Table 5 below.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

The UE needs to calculate an SNR as a factor necessary to calculate CQI. In this case, receive power measurement (S-measure) of a desired signal may be performed using an RS such as an NZP CSI-RS and power of an interference signal obtained by removing the desired signal from the received signal is measured for interference power measurement (I-measure or interference measurement (IM)).

Subframe sets $C_{CSI,0}$ and $C_{SCI,1}$ for CSI measurement may be configured via higher layer signaling and subframes corresponding to the subframe sets are included in one set without overlapping with each other. In this case, the UE may perform S-measure via an RS such as a CSI-RS without special subframe restriction but should individually perform I-measure with respect to $C_{CSI,0}$ and $C_{CSI,1}$ to calculate two different CSI for $C_{CSI,0}$ and $C_{CSI,1}$.

In the following description, an example for a transmission mode of a downlink data channel is described.

Currently, 3GPP LTE standard document, specifically, 3GPP TS 36. 213 document defines a transmission mode of a downlink data channel as shown in Table 6 and Table 7 in the following. The transmission mode is set to a user equipment via an upper layer signaling, i.e., RRC signaling.

TABLE 6

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |

TABLE 6-continued

| Transmission mode | DCI format | Transmission scheme of PDSCH corresponding to PDCCH |
|---|---|---|
| Mode 2 | DCI format 1A | Transmit diversity |
| | DCI format 1 | Transmit diversity |
| Mode 3 | DCI format 1A | Transmit diversity |
| | DGI format 2A | Large delay CDD or Transmit diversity |
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity<br>MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity<br>MBSFN subframe: Single-antenna port, port 7 |
| | DCI format 2D | Up to 8 layer transmission, ports 7-14 or single-antenna port, port 7 or 8 |

TABLE 7

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Transmit diversity |
| Mode 4 | DCI format 1A | Transmit diversity |
| | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
| | DCI format 1 | Single-antenna port, port 5 |
| Mode 8 | DCI format 1A | Single-antenna port, port 7 |
| | DCI format 2B | Single-antenna port, port 7 or 8 |
| Mode 9 | DCI format 1A | Single-antenna port, port 7 |
| | DCI format 2C | Single-antenna port, port 7 or 8, |
| Mode 10 | DCI format 1A | Single-antenna port, port. 7 |
| | DCI format 2D | Single-antenna port, port 7 or 8, |

Referring to Table 6 and Table 7, current 3GPP LTE standard document includes a downlink control information (DCI) format, which is defined according to a type of RNTI masked on PDCCH. In particular, in case of a C-RNTI and an SPS C-RNTI, a transmission mode and a DCI format corresponding to the transmission mode (i.e., a transmission mode-based DCI format) are included in the document. And, a DCI format 1A for a Fall-back mode, which is capable of being applied irrespective of each transmission mode, is defined in the document. Table 6 shows an example of a case that a type of RNTI masked on PDCCH corresponds to a C-RNTI and Table 7 shows an example of a case that the type of RNTI masked on PDCCH corresponds to an SPS C-RNTI.

As an example of an operation of a transmission mode, referring to Table 6, if a user equipment performs a blind decoding on PDCCH masked with C-RNTI and then detects a DCI format 1B, the user equipment decodes PDSCH in an assumption that the PDSCH has been transmitted with a closed-loop spatial multiplexing scheme using a single transmission layer.

In Table 6 and Table 7, a transmission mode 10 indicates a downlink data channel transmission mode of the aforementioned CoMP transmission method. For instance, referring to Table 1, if a user equipment performs a blind decoding on PDCCH masked with C-RNTI and then detects a DCI format 2D, the user equipment decodes PDSCH in an assumption that the PDSCH has been transmitted with a multi-layer transmission scheme based on antenna port 7 to 14, i.e., DM-RS. Or, the user equipment decodes PDSCH in an assumption that the PDSCH has been transmitted with a single antenna transmission scheme based on DM-RS antenna port 7 or 8.

On the contrary, if the user equipment performs blind decoding on PDCCH masked with C-RNTI and then detects a DCI format 1A, a transmission mode varies according to whether a corresponding subframe corresponds to an MBSFN subframe. For instance, if the corresponding subframe corresponds to a non-MBSFN subframe, the user equipment decodes PDSCH in an assumption that the PDSCH has been transmitted with a single antenna transmission scheme based on a CRS of an antenna port 0 or a CRS-based transmit diversity scheme. And, if the corresponding subframe corresponds to an MBSFN subframe, the user equipment decodes the PDSCH in an assumption that the PDSCH has been transmitted with a single antenna transmission based on a DM-RS of an antenna port 7.

Meanwhile, recently, in the 3GPP LTE-A standard, for transmission mode 10 of PDSCH transmission of a CoMP scheme, a PQI (PDSCH RE Mapping and Quasi-Co-Location Indicator) field was defined in DCI format 2D. More specifically, the PQI field has a size of 2 bits and indicates a total of four states. Information indicated by each state is a parameter set for receiving a PDSCH of a CoMP scheme and detailed values thereof are pre-signaled via a higher layer.

The information included in the parameter set includes one or more of the count of CRS antenna ports (crs-PrtsCount), a frequency shift value of a CRS (crs-FreqShift), an MBSFN subframe configuration (mbsfn-SubframeConfigList), a ZP CSI-RS configuration (crs-RS-ConfigZPId), a PDSCH start symbol (pdsch-Start) and QCL (Quasi Co-Location) information of an NZP (Non-ZP) CSI-RS (qcl-CSI-RS-ConfigNZPId).

In the following, QCL (Quasi Co-Location) between antenna ports is explained.

QCL between antenna ports indicates that all or a part of large-scale properties of a signal (or a radio channel corresponding to a corresponding antenna port) received by a user equipment from a single antenna port may be identical to large-scale properties of a signal (or a radio channel corresponding to a corresponding antenna port) received from a different single antenna port. In this case, the larger-scale properties may include Doppler spread related to frequency offset, Doppler shift, average delay related to timing offset, delay spread and the like. Moreover, the larger-scale properties may include average gain as well.

According to the aforementioned definition, a user equipment cannot assume that the large-scale properties are identical to each other between antenna ports not in the QCL, i.e., NQCL (Non Quasi co-located) antenna ports. In this case, the user equipment should independently perform a tracking procedure to obtain frequency offset, timing offset and the like according to an antenna port.

On the contrary, the user equipment can perform following operations between antenna ports in QCL.

1) The user equipment can identically apply power-delay profile for a radio channel corresponding to a specific antenna port, delay spread, Doppler spectrum and Doppler spread estimation result to a Wiener filter parameter, which is used for estimating a channel for a radio channel corresponding to a different antenna port, and the like.

2) After obtaining time synchronization and frequency synchronization for the specific antenna port, the user equipment can apply identical synchronization to a different antenna port as well.

3) The user equipment can calculate an average value of RSRP (reference signal received power) measurement values of each of the antenna ports in QCL to obtain average gain.

For instance, having received DM-RS based downlink data channel scheduling information (e.g., DCI format 2C) via PDCCH (or E-PDCCH), the user equipment performs channel estimation for PDSCH via a DM-RS sequence indicated by the scheduling information and may be then able to perform data demodulation.

In this case, if a DM-RS antenna port used for demodulating a downlink data channel and a CRS antenna port of a serving cell are in QCL, when the user equipment performs a channel estimation via the DM-RS antenna port, the user equipment can enhance reception capability of the DM-RS based downlink data channel in a manner of applying large-scale properties of a radio channel estimated from a CRS antenna port of the user equipment as it is.

Similarly, if a DM-RS antenna port used for demodulating a downlink data channel and a CSI-RS antenna port of a serving cell are in QCL, when the user equipment perform a channel estimation via the DM-RS antenna port, the user equipment can enhance reception capability of the DM-RS based downlink data channel in a manner of applying large-scale properties of a radio channel estimated from a CSI-RS antenna port of the serving cell as it is.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals.

On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

In a current wireless communication environment, with emergence and dissemination of various devices requiring machine-to-machine (M2M) communication and high data transfer rate, data requirements of a cellular network are growing very quickly. To satisfy high data requirements, carrier aggregation technology for efficiently using a larger frequency band, multi antenna technology for increasing data capacity within a restricted frequency, multi base-station coordinated technology, etc. have been developed as communication technology and a communication environment is evolved to increase the density of nodes which can be accessed by users. Coordination between nodes may improve system performance of a system with such a high density of nodes. In such a system, each node operates as an independent base station (BS), an advanced BS (ABS), a node B (NB), an eNodeB (eNB), an access point (AP), etc. and is far superior performance to a non-coordinated system.

Figure 12:
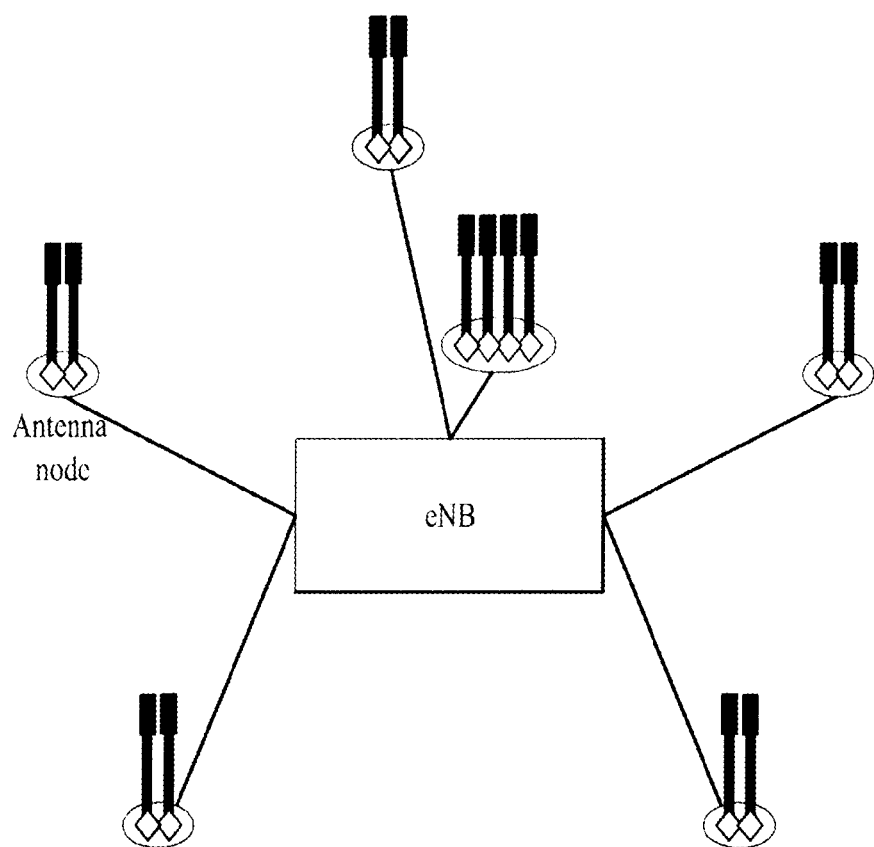
FIG. 12 is a diagram showing a multi-node system in a next-generation communication system.

FIG. 12 is a diagram showing a multi-node system in a next-generation communication system.

Referring to FIG. 8, if transmission and reception of all nodes are managed by one controller such that the individual nodes operate as parts of an antenna group of one cell, this system may be regarded as a distributed multi node system (DMNS) forming one cell. At this time, the individual nodes may be assigned separate node IDs or may operate as some antennas of a cell without a separate node ID. However, a system including nodes having different cell identifiers (IDs) may be a multi cell system. If multiple cells are configured to overlap according to coverage, this is called a multi-tier network.

A NodeB, an eNodeB, a PeNB, a HeNB, a remote radio head (RRH), a relay, a distributed antenna, etc. may become a node and at least one antenna is mounted per node. The node is also called a transmission point. Although the node generally refers to a group of antennas separated at a predetermined interval or more, the present invention is applicable to an arbitrary group of nodes defined regardless of an interval.

Due to introduction of the above-described multi node system and relay node, various communication schemes are applicable to improve channel quality. However, in order to apply the MIMO scheme and an inter-cell communication scheme to a multi node environment, a new control channel is required. Accordingly, an enhanced-physical downlink control channel (E-PDCCH) is being discussed as a newly introduced control channel and is allocated to a data region (hereinafter, referred to as a PDSCH region), not to an existing control region, (hereinafter, referred to as a PDCCH region). In conclusion, control information of a node can be transmitted to each UE via such an E-PDCCH so as to solve a problem that an existing PDCCH region is insufficient. For reference, the E-PDCCH may not be transmitted to a legacy UE but may only be transmitted to an LTE-A UE. In addition, the E-PDCCH is transmitted and received not based on a cell-specific reference signal (CRS) but based on a demodulation reference signal (DM-RS) which is a UE-specific reference signal.

Figure 13:
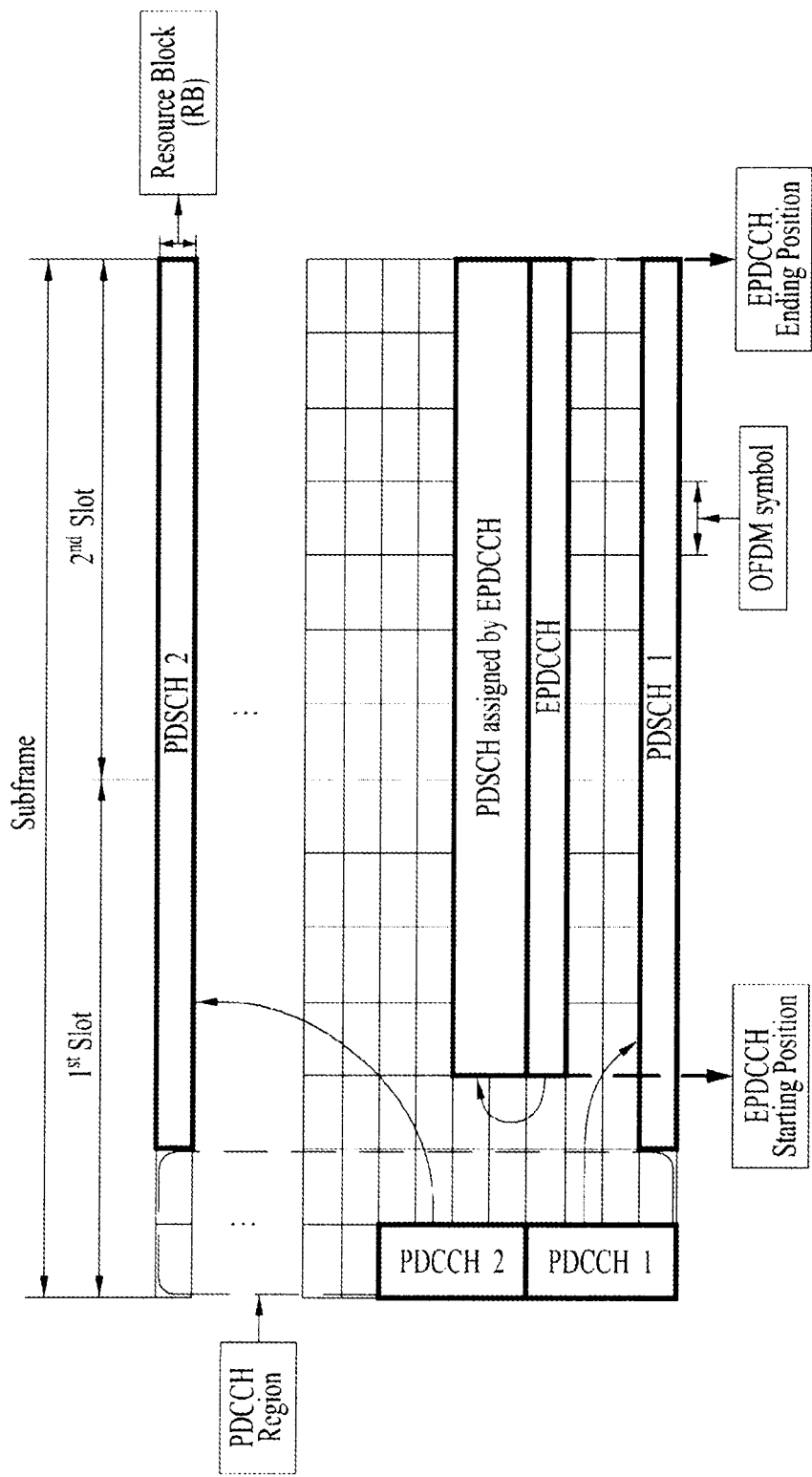
FIG. 13 is a diagram showing an E-PDCCH and a PDSCH scheduled by the E-PDCCH.

FIG. 13 is a diagram showing an E-PDCCH and a PDSCH scheduled by the E-PDCCH.

Referring to FIG. 13, PDCCH 1 and PDCCH 2 respectively schedule PDSCH 1 and PDSCH 2 and an EPDCCH schedules another PDSCH. In particular, in FIG. 13, the EPDCCH is transmitted starting from a fourth symbol of a subframe up to a last symbol. The EPDCCH may be generally transmitted via a PDSCH region for transmitting data and a UE monitors EPDCCH candidates in order to detect presence/absence of the EPDCCH thereof.

Hereinafter, a semi-persistent scheduling scheme will be described.

Currently, in an LTE system, in semi-persistent scheduling (SPS), a UE is informed as to on which subframe SPS PDSCH transmission and reception should be performed (more specifically, with subframe periodicity and offset) via RRC signaling in advance and activation and deactivation of SPS is performed via a PDSCH.

That is, the UE does not immediately perform SPS transmission and reception even upon receiving SPS information via RRC signaling, but performs SPS transmission and reception with the subframe periodicity and offset indicated by the SPS information using resource assignment information indicated by the PDCCH upon receiving a PDCCH indicating activation (or reactivation) (more specifically, upon detecting a PDCCH masked with an SPS C-RNTI) and stops SPS transmission and reception upon receiving a PDCCH indicating SPS release.

The stopped SPS transmission and reception is resumed with the subframe periodicity and offset indicated by the SPS information using resource assignment information indicated by the PDCCH, upon receiving a PDCCH indicating activation (or reactivation).

First Embodiment

If a UE is configured with QCL type A, CRS related information indicated by a specific PQI state and, more specifically, rate matching (RM) information due to a CRS RE may be information about a non-serving cell. At this time, a serving cell CRS is a non-MBSFN subframe. However, according to MBSFN subframe information indicated by the PQI, if a current subframe indicates an MBSFN subframe and RM is performed by the indicated CRS RM information, the CRS RE of the serving cell is not subjected to RM and thus may overlap a PDSCH RE.

That is, a specific RE of the PDSCH overlapping the CRS of the serving cell means that, in QCL type A, since the PDSCH is transmitted by the serving cell, the serving cell should simultaneously transmit the CRS and the PDSCH on the corresponding RE and the UE receives the CRS and the PDSCH. In this case, the PDSCH RE strongly interferes with the CRS.

This problem may occur in an EPDCCH in addition to the PDSCH. That is, if the EPDCCH is configured with QCL type A, the EPDCCH may specific PQI and CRS RM information indicated by the specific PQI may indicate information about a non-serving cell. At this time, collision may occur between the serving cell CRS and the EPDCCH in a specific RE.

In this case, the following solutions are possible.

1) First, the UE may not expect to receive scheduling such that the serving cell CRS and the PDSCH (or the EPDCCH) RE collide. If the indicated CRS RM related information is information about the non-serving cell, e.g., if a current subframe is a non-MBSFN of the serving cell and the indicated CRS RM related MBSFN SF information is an MBSFN, it may be assumed that scheduling may not be received. If the PDSCH (or the EPDCCH) is configured with QCL type A, the eNB cannot transmit the PDSCH (or the EPDCCH) using PQI indicating CRS RM information of the non-serving cell if the serving cell CRS is a non-MBSFN subframe and PQI indicating CRS RM information of the non-serving cell may be used only when the serving cell CRS is an MBSFN subframe.

2) Alternatively, if the serving cell CRS and the PDSCH (or the EPDCCH) collide on specific REs, the UE applies puncturing to the corresponding RE positions. That is, REs colliding upon receiving the PDSCH (or the EPDCCH) are punctured and then decoding may be performed. The eNB may recognize and consider the puncturing operation of the UE upon MCS configuration.

3) Additionally, if the serving cell CRS and the PDSCH (or the EPDCCH) collide on specific REs, the eNB may perform RM with respect to the corresponding REs and transmit the PDSCH (or the EPDCCH) and the UE may perform RM with respect to the corresponding RE positions.

More specifically, if the UE is configured with QCL type A, RM may be defined to be always performed at the serving cell CRS RE positions. Of course, the eNB also applies RM to the serving cell CRS RE positions. That is, if CRS RM information is indicated by PQI, etc., the eNB and the UE may be regarded as performing multiple RM.

The parameter set indicated in the PQI field may be defined as in Table 8 below.

TABLE 8

| PDSCH-RE-MappingQCL-Config-r11 ::=<br>    pdsch-RE-MappingQCL-ConfigId-r11<br>    pdsch-Start-r11<br>    csi-RS-IdentityZP-r11<br>    re-MappingQCL-CSI-RS-IdentityNZP-r11<br>} | SEQUENCE {<br>    PDSCH-RE-MappingQCL-ConfigId-r11,<br>    ENUMERATED {reserved, n1, n2, n3, n4, assigned}<br>    CSI-RS-IdentityZP-r11,<br>    CSI-RS-IdentityNZP-r11 |
|---|---|

In Table 8 above, pdsch-RE-MappingQCL-ConfigId-r11 has a value of 1 to 4. Assume that a maximum of 4 PQI states are present.

PDSCH start symbol information (pdsch-Start-r11), one ZP CSI-RS information (csi-RS-IdentityZP-r11), QCL and CRS RM related information (re-MappingQCL-CSI-RS-IdentityNZP-r11) may be configured per PQI state.

At this time, the QCL and CRS RM related information indicates one specific NZP CSI-RS resource (CSI-RS-IdentityNZP-r11) and a specific NZP CSI-RS is valid as QCL information between a DM-RS and a CSI-RS in the case of QCL type B.

Additionally, the specific NZP CSI-RS may be linked to a predetermined NZP CSI-RS resource via RRC layer signaling. Here, an NZP CSI-RS resource is defined as in Table 9 below and information about a CRS to which QCL is applied is included. Accordingly, in the present invention, QCL is applied between a CRS, in which QCL with a linked NZP CSI-RS is assumed, and the specific NZP CSI-RS and information about the CRS, in which QCL with the linked NZP CSI-RS is assumed, may be designed to be used as CRS RM information of the PQI state.

TABLE 9

```
CSI-RS-ConfigNZP-r11 ::= SEQUENCE {
    csi-RS-IdentityNZP-r11      CSI-RS-IdentityNZP-r11,
    antennaPortsCount-r11       ENUMERATED (an1, an2, an4, an8},
    resourceConfig-r11          INTEGER (0..31),
    subframeConfig-r11          INTEGER (0..154),
    scramblingIdentity-r11      INTEGER (0..503),
    qcl-CRS-Info-r11            SEQUENCE {
        qcl-ScramblingIdentity-r11   INTEGER (0..503},
        crs-PortsCount-r11           ENUMERATED {n1, n2, n4, spare1},
        mbsfn-SubframeConfig-r11     MBSFN-SubframeConfig  OPTIONAL, -- Need OR
    }                                                     OPTIONAL, -- Need OR
    ...
}
```

In the case of QCL type A, one NZP CSI-RS resource is not applied to the PQI state as QCL information between the DM-RS and the CSI-RS, that is, is ignored, and such CRS information may be used as CRS RM information of the PQI state via information about the CRS, in which QCL with the linked NZP CSI-RS is assumed.

If a PDSCH is configured with QCL type A and an EPDCCH is configured with QCL type B, the indicated NZP CSI-RS resource is not applied to the PDSCH as QCL information between the DM-RS and the CSI-RS. However, for QCL type B of the EPDCCH, if this PQI state is linked to the EPDCCH, the NZP CSI-RS resource may be defined to be valid as QCL information between the DM-RS and the CSI-RS for EPDCCH decoding.

In contrast, if PDSCH is configured with QCL type B and an EPDCCH is configured with QCL type A, the indicated NZP CSI-RS resource is valid with respect to the PDSCH as QCL information between the DM-RS and the CSI-RS. However, for QCL type A of the EPDCCH, if this PQI state is linked to the EPDCCH, the NZP CSI-RS resource may be ignored as QCL information between the DM-RS and the CSI-RS for EPDCCH decoding.

However, the information about the CRS, in which QCL with the linked NZP CSI-RS is assumed, should always be used for CRS RM with respect to both the PDSCH and the EPDCCH.

In summary, the NZP CSI-RS resource indicated per PQI state is ignored as QCL information between the DM-RS and the CSI0RS in QCL type A with respect to both the PDSCH and the EPDCCH and is valid as QCL information between the DM-RS and the CSI-RS in QCL type B with respect to both the PDSCH and the EPDCCH. Additionally, an NZP CSI-RS resource linked to the NZP CSI-RS indicated per PQI state is present and the information about the CRS, in which QCL with the NZP CSI-RS resource is assumed, should always be used for CRS RM with respect to both the PDSCH and the EPDCCH.

Second Embodiment

Meanwhile, in interpretation of the PQI field and operation related thereto in SPS, the following cases may be considered.

1. First, referring to Table 7, in transmission mode 10 which is a CoMP mode, for PDSCH scheduling, DCI format 2D is used and DCI format 1A is used as a fallback mode. Accordingly, in the present invention, only DCI format 1A may be used as DCI format for SPS activation. That is, SPS activation is impossible using DCI format 2D. If a PQI field is not present in DCI format 1A, SPS activation may be interpreted as being possible in DCI format without the PQI field. The PQI field indicates dynamic information of the current subframe. In the case of SPS, since scheduling is semi-persistently and automatically set with respect to subsequent subframes with specific periodicity in advance until SPS deactivation is performed, continuously applying the PQI field information of the current activation subframe thereafter may not be preferable.

Alternatively, in transmission mode 10 which is a CoMP mode, SPS activation may be prohibited. That is, in transmission mode 10, both DCI format 2D and DCI format 1A may be defined not to support SPS activation. In other words, in order to schedule PDSCH transmission by SPS, the PDSCH should be scheduled to transmission mode 9 or less.

Alternatively, in transmission mode 10 which is a CoMP mode, only DCI format 1A is used as DCI format for SPS activation and constraints (1) to (6) may be imposed.

(1) SPS activation is possible only when DCI format 1A is detected from a common search space (or a UE-specific search space)

(2) SPS activation is possible only when DCI format 1A is detected from a non-MBSFN subframe (or an MBSFN subframe)

(3) SPS activation is possible only when DCI format 1A is detected from a common search space (or a UE-specific search space) in a non-MBSFN subframe (4) SPS activation is possible only when DCI format 1A is detected from a common search space (or a UE-specific search space) in an MBSFN subframe (5) SPS activation is possible only when DCI format 1A is detected from a non-MBSFN subframe or a common search space (or a UE-specific search space) in an MBSFN subframe (6) SPS activation is possible only when DCI format 1A is detected from an MBSFN subframe and a common search space (or a UE-specific search space) in a non-MBSFN subframe Of course, (1) to (6) may be defined such that SPS activation is possible only via DCI format 1A without a PQI field.

2. In transmission mode 10, SPS activation is possible via DCI format with a PQI field and information about the PQI field is valid only for a subframe currently indicating SPS activation and subsequent subframes semi-persistently scheduled by SPS follows PQI information of a downlink serving cell.

At this time, information about a PDSCH start symbol may follow the PDSCH start symbol for another carrier aggregation serving cell or an EPDCCH of a downlink serving cell if information about a PDSCH start symbol for another carrier aggregation serving cell or the EPDCCH of the downlink serving cell is set via RRC signaling and, otherwise, may follow PCFICH information of a downlink serving cell (or PCFICH information of a specific transmission point).

All or some of other PQI information other than information about the PDSCH start symbol may be continuously applied to subsequent subframes semi-persistently scheduled by SPS after information indicated by the PQI field of the DCI format upon SPS activation. For example, the PQI information other than the information about the PDSCH start symbol may persistently follow the PQI information indicated upon SPS activation and the information about the PDSCH start symbol may follow information about the downlink serving cell as described above.

3. If the methods of 1 and 2 are fixedly used, PSDCH scheduling by SPS may be significantly restricted. Accordingly, in order to guarantee more flexible scheduling, different rules may be defined to be applied per DCI format as described in a) to b) below.

a) If DCI format 1A including a PQI field is received to indicate SPS activation or a PQI field is not included in DCI format 1A but any default information (or RRC configuration information) for all or some of information included in the PQI field is configured with DCI format 1A, the UE applies the information indicated by the PQI field or default information (or RRC configuration information) to only this subframe.

However, if DCI format 2A including a PQI field is received to indicate SPS activation, the UE applies all or some of information indicated by the PQI field not only to this subframe but also to subsequent subframes semi-persistently scheduled by SPS.

b) if DCI format 2D including a PQI field is received to indicate SPS activation, the UE applies all or some of information indicated by the PQI information to only this subframe.

However, if SPS activation is indicated by DCI format 1A including a PQI field or a PQI field is not included in DCI format 1A but any default information (or RRC configuration information) for all or some of information included in the PQI field is configured with DCI format 1A and SPS activation is indicated by DCI format 1A, the UE applies all or some of the information indicated by the PQI field or default information (or RRC configuration information) not only to this subframe but also to subsequent subframes semi-persistently scheduled by SPS.

4. The following rules are defined in order to support CoMP operation by SPS.

If it is assumed that SPS activation is performed by specific DCI format and, thereafter, PDSCH transmission by SPS is performed at an interval of T ms and if scheduling information (that is, DCI format) including a PQI field is present during X ms (e.g., X=T−1) upon PDSCH transmission by SPS of specific subframe #N, specific subframe #N follows all or some of information indicated by a PQI field recently received within X ms without change.

Alternatively, upon SPS PDSCH transmission of subframe #N, if scheduling information for SPS PDSCH retransmission (or latest scheduling information if a plurality of scheduling information for retransmission is present) including a PQI field has been received during X ms, subframe #N follows all or some of the information indicated by the PQI field without change, which may be restricted to retransmission.

Additionally, all or some of the information indicated by the PQI field may be continuously applied until update is performed or is applied to only subframe #N and subsequent subframes may follow information about the downlink serving cell by default or all or follow some of information indicated by the PQI field applied upon initial SPS activation.

Alternatively, if a PQI field is included in scheduling information for retransmission of the SPS PDSCH, this PQI field may be restricted to be necessarily set as the same information as all or some of the information indicated by the PQI field in scheduling information indicating initial SPS activation.

Additionally, a PQI field may be defined not to be included in scheduling information for SPS PDSCH retransmission. The PQI field being not included may mean that, if a PQI field is included in scheduling information indicating initial SPS activation, all or some of the information indicated by this PQI field is also applied to SPS PDSCH retransmission.

Whether interpretation and rules of scheduling information (or DCI format) of the SPS PDSCH are applied may be determined via RRC signaling.

In summary, information indicated by the PQI field may be no longer directly sent with respect to PDSCH transmission of an interval of T ms by SPS. Accordingly, if information indicated by a PQI field is included in scheduling information masked and transmitted with a normal C-RNTI or scheduling information for SPS PDSCH retransmission, including PQI field, has been received, the information follows the PQI field and a latest instantaneous environment is applicable to transmission of a current subframe and subsequent SPS PDSCHs thereof.

Third Embodiment

Although the PQI field is defined as a separate 2-bit field, the present invention is not limited thereto. That is, the PQI field may be defined to an N-bit field, some of the N bits may be explicitly added, and the remaining bits thereof may borrow existing fields. For example, in the case of N=2, a new 1-bit field is defined and is linked to a scrambling identifier field nSCID having a value of 0 or 1 to perform joint encoding with a total of 4 states.

In addition, for each of $2^N$ states defined by N bits, a method of individually setting QCL type A or QCL type B via RRC signaling may be considered. That is, for each of $2^N$ states, whether the state is of QCL type A or QCL type B is specified via RRC signaling. When a specific state is indicated by DCI, QCL between a serving cell CRS and a DM-RS may be applied according to QCL type A and QCL between a specific CSI-RS and a DM-RS may be applied according to QCL type B.

Alternatively, when RRC signaling for setting each of $2^N$ states to QCL type B is not received, the state may be configured with QCL type A as default. That is, the default QCL type of each of $2^N$ states is QCL type A and QCL type B is additionally set per state.

More specifically, if an NZP CSI-RS resource index is configured in a specific state, QCL type B is set and thus QCL between the NZP CS-RS and a DM-RS is applied. However, if an NZP CSI-RS resource index is not configured in a specific state, the state is of QCL type A as the default QCL type and the UE applies QCL between a serving cell CRS and a DM-RS.

In the third embodiment of the present invention, the UE restricts the maximum type number M related to QCL to a specific value or less to maintain processing complexity of the UE at a predetermined level. Preferably, M=4 may be set.

For example, for each of three states among of $2^N$ states, QCL types B for three different NZP CSI-RSs may be differently set. That is, the three states are all configured with QCL type B and QCL links thereof are differently configured with CSI-RS1, CSI-RS2 and CSI-RS3. Therefore, the UE may apply 3 different QCL types B to estimate three different large-scale properties.

Additionally, an EPDCCH QCL type for an EPDCCH may be defined and may include two types, that is, EPDCCH QCL type A (that is, QCL between a serving cell CRS and an EPDCCH DM-RS) and EPDCCH QCL type B (that is, QCL between a specific CSI-RS and an EPDCCH DM-RS). Accordingly, if EPDCCH QCL type A is set, the UE should estimate a large-scale property for EPDCCH QCL type A as another QCL type. Therefore, M=4 is preferably set. If EPDCCH QCL type A or EPDCCH QCL type B is independently set per EPDCCH set, QCL assumption with a CSI-RS other than CSI-RS1, CSI-RS2 and CSI-RS3 may be regarded as no longer possible in another EPDCCH set.

In order to reduce processing complexity of the UE, M=3 may be set. Such an M value may be defined as UE capability. That is, UEs each having a maximum M value included in capability parameters thereof may be manufactured/released. In other words, an eNB is enabled to recognize that a certain UE has maximum capability of M=3 and another UE has maximum capability of M=4, such that the eNB may appropriately set QCL types via a higher layer in consideration of the M value of each UE.

There are various methods of expressing capability or an M value. For example, L different NZP CSI-RS resources may be only set over all $2^N$ states. In this case, L<=M. For example, if L=2, the number of different NZP CSI-RS resources set via $2^N$ states is a maximum of 2, CSI-RS1 and CSI-RS are respectively indicated in specific states, but another NZP CSI-RS resource may not be indicated.

Figure 14:
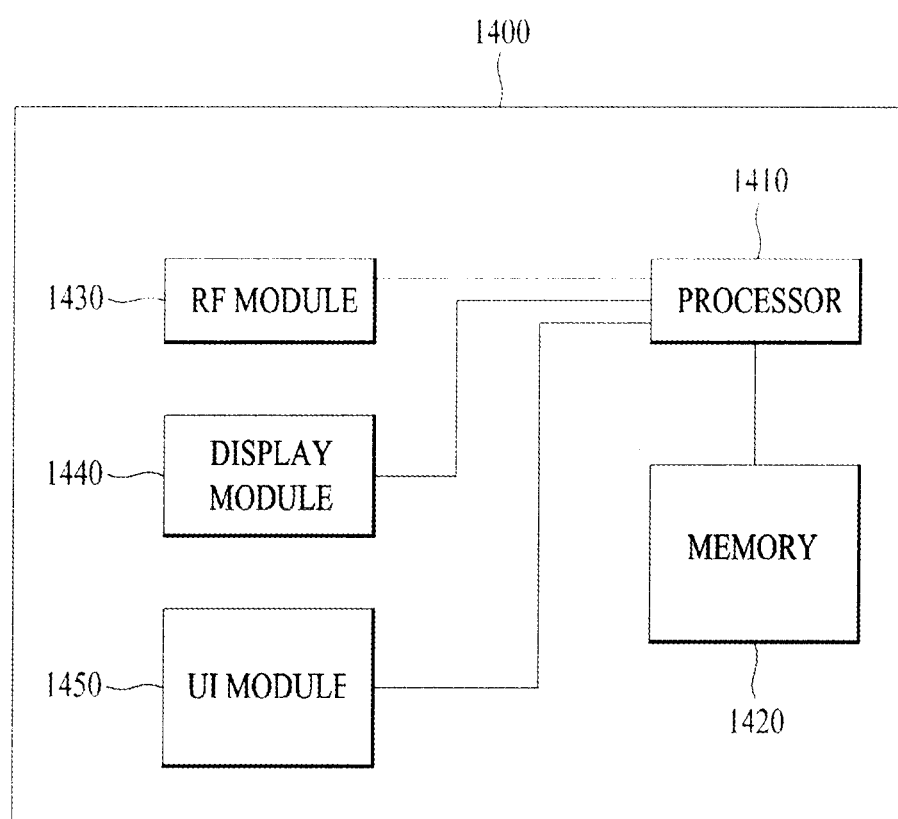
FIG. 14 is a block diagram of a communication apparatus according to one embodiment of the present invention.

FIG. 14 is a block diagram of a communication apparatus according to one embodiment of the present invention.

Referring to FIG. 14, a communication apparatus 1400 includes a processor 1410, a memory 1420, a Radio Frequency (RF) module 1430, a display module 1440 and a user interface module 1450.

The communication apparatus 1400 is shown for convenience of description and some modules thereof may be omitted. In addition, the communication apparatus 1400 may further include necessary modules. In addition, some modules of the communication apparatus 1400 may be subdivided. The processor 1410 is configured to perform an operation of the embodiment of the present invention described with reference to the drawings. For a detailed description of the operation of the processor 1410, reference may be made to the description associated with FIGS. 1 to 13.

The memory 1420 is connected to the processor 1410 so as to store an operating system, an application, program code, data and the like. The RF module 1430 is connected to the processor 1410 so as to perform a function for converting a baseband signal into a radio signal or converting a radio signal into a baseband signal. The RF module 1430 performs analog conversion, amplification, filtering and frequency up-conversion or inverse processes thereof. The display module 1440 is connected to the processor 1410 so as to display a variety of information. As the display module 1440, although not limited thereto, a well-known device such as a Liquid Crystal Display (LCD), a Light Emitting Diode (LED), or an Organic Light Emitting Diode (OLED) may be used. The user interface module 1450 is connected to the processor 1410 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example in which a method and apparatus for transmitting and receiving a downlink signal in a wireless communication system is applied to a 3GPP LTE system has been described, the present invention is applicable to various wireless communication systems in addition to the 3GPP LTE system.

The invention claimed is:

1. A method of receiving a downlink signal using a semi persistent scheduling (SPS) scheme at a user equipment (UE) in a wireless communication system, the method comprising:
   receiving a plurality of parameter sets, each parameter set including a parameter for a non-zero power channel status information-reference signal (CSI-RS) configuration;
   receiving, on a first subframe, first type downlink control information (DCI) including an indicator indicating one of the plurality of parameter sets or second type DCI not including the indicator; and
   receiving the downlink signal on the first subframe and a second subframe configured via radio resource control (RRC) signaling after the first subframe based on a demodulation-RS (DM-RS), according to resource assignment information included in the first type DCI or the second type DCI,
   wherein the first type DCI and the second type DCI indicate activation of the SPS scheme, and
   wherein the UE assumes that a non-zero power CSI-RS of a non-zero power CSI-RS configuration included in a parameter set among the plurality of parameter sets and the DM-RS of the first subframe and the second subframe are quasi co-location (QCL).

2. The method according to claim 1, wherein, if the first type DCI is received, the downlink signal is received on the first subframe and the second subframe based on the non-zero power CSI-RS configuration included in the parameter set indicated by the indicator included in the first type DCI.

3. The method according to claim 1, wherein, if the second type DCI is received, the downlink signal is received on the first subframe and the second subframe based on the non-zero power CSI-RS configuration included in a predetermined parameter set.

4. The method according to claim 1, wherein a large scale property of the non-zero power CSI-RS is equal to that of the DM-RS for demodulating the downlink signal.

5. The method according to claim 4, wherein the large scale property includes at least one of Doppler spread, Doppler shift, average delay and delay spread.

6. A method of transmitting a downlink signal to a user equipment (UE) using a semi persistent scheduling (SPS) scheme at a network in a wireless communication system, the method comprising:
   transmitting a plurality of parameter sets, each parameter set including a parameter for a non-zero power channel status information-reference signal (CSI-RS) configuration;
   transmitting, on a first subframe, first type downlink control information (DCI) including an indicator indicating one of the plurality of parameter sets or second type DCI not including the indicator; and
   transmitting the downlink signal on the first subframe and a second subframe configured via radio resource control (RRC) signaling after the first subframe based on a demodulation-RS (DM-RS), according to resource assignment information included in the first type DCI or the second type DCI,
   wherein the first type DCI and the second type DCI indicate activation of the SPS scheme, and
   wherein the UE assumes that a non-zero power CSI-RS of a non-zero power CSI-RS configuration included in a parameter set among the plurality of parameter sets and ft the DM-RS of the first subframe and the second subframe are quasi co-location (QCL).

7. The method according to claim 6, wherein, if the first type DCI is transmitted, the downlink signal is transmitted on the first subframe and the second subframe based on the non-zero power CSI-RS configuration included in the parameter set indicated by the by the indicator included in the first type DCI.

8. The method according to claim 6, wherein, if the second type DCI is transmitted, the downlink signal is transmitted on the first subframe and the second subframe based on the non-zero power CSI-RS configuration included in a predetermined parameter set.

9. The method according to claim 6, wherein a large scale property of the non-zero power CSI-RS is equal to that of the DM-RS for demodulating the downlink signal.

10. The method according to claim 9, wherein the large scale property includes at least one of Doppler spread, Doppler shift, average delay and delay spread.

* * * * *